Jan. 14, 1930.　　　　H. C. SCHAPER　　　　1,743,163
WEIGHING SCALE
Filed June 27, 1927　　　8 Sheets-Sheet 1
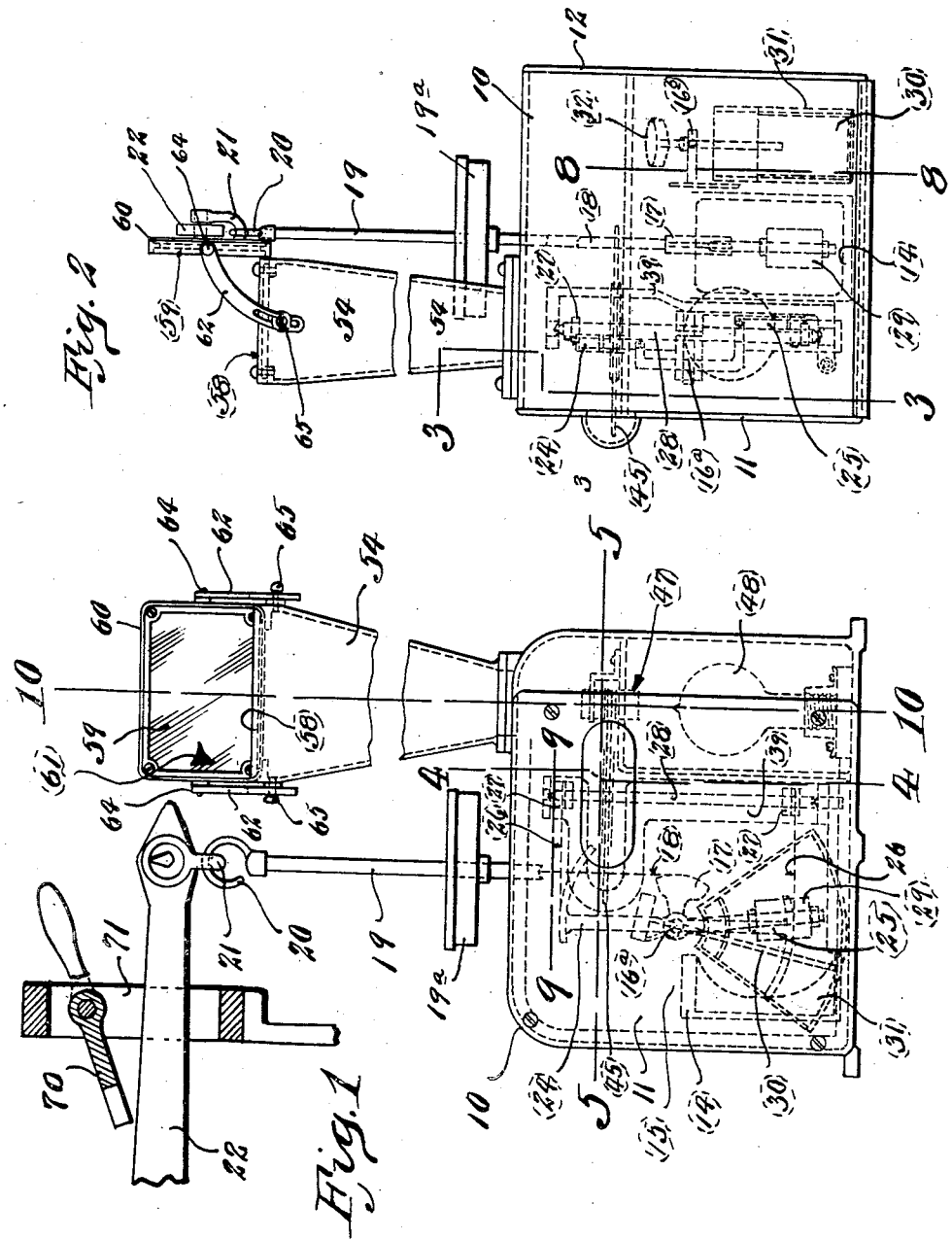
Inventor
Harry C. Schaper
By Cornwall, Bedell & Janus
Atty's.

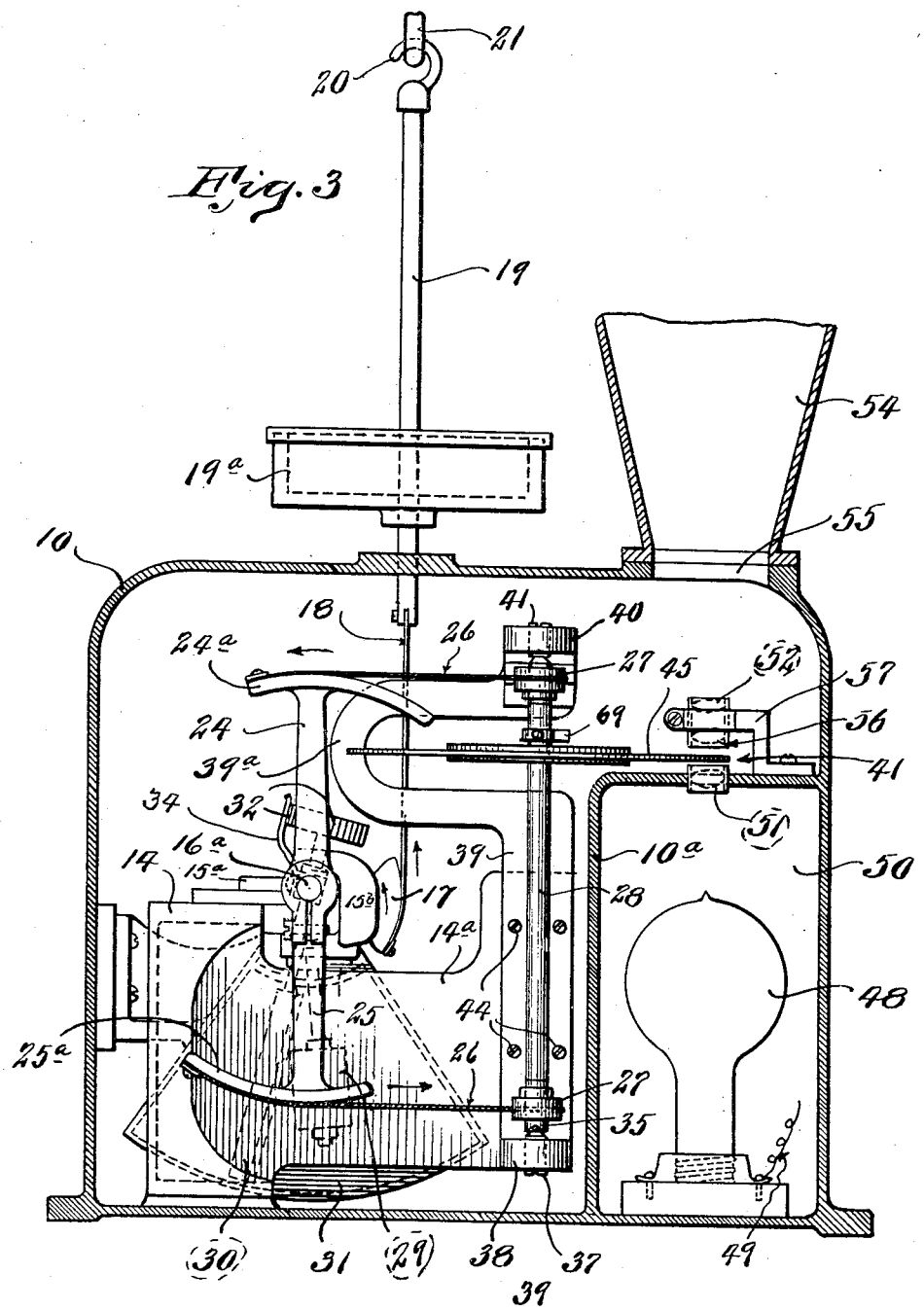

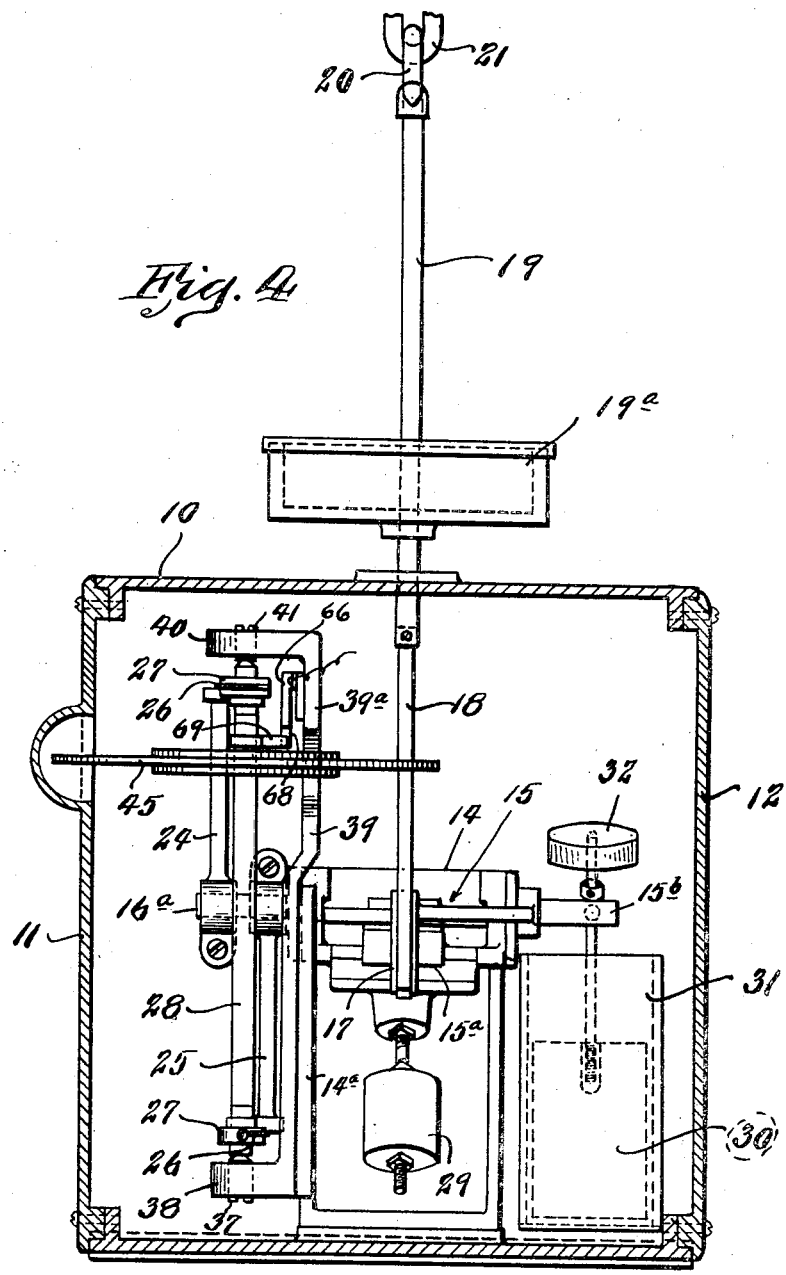

Jan. 14, 1930.  H. C. SCHAPER  1,743,163
WEIGHING SCALE
Filed June 27, 1927     8 Sheets-Sheet 4

Inventor
Harry C. Schaper
By Cornwall, Bidell & James
Attys.

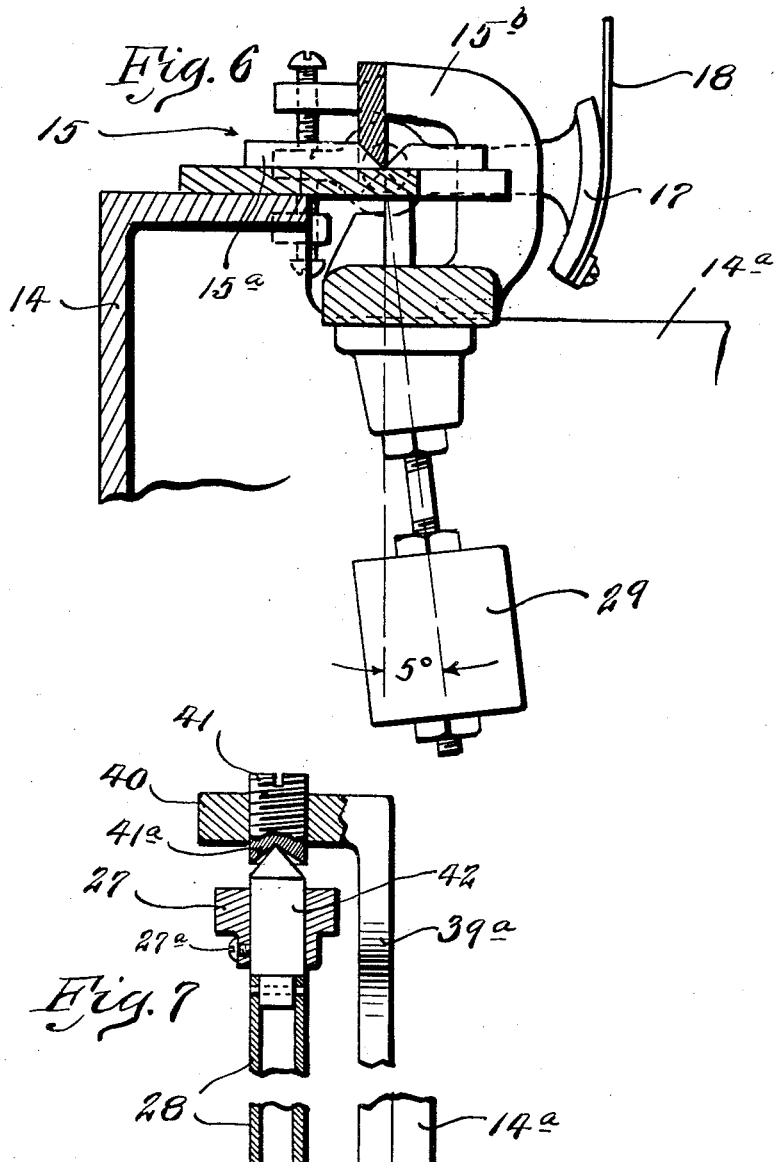

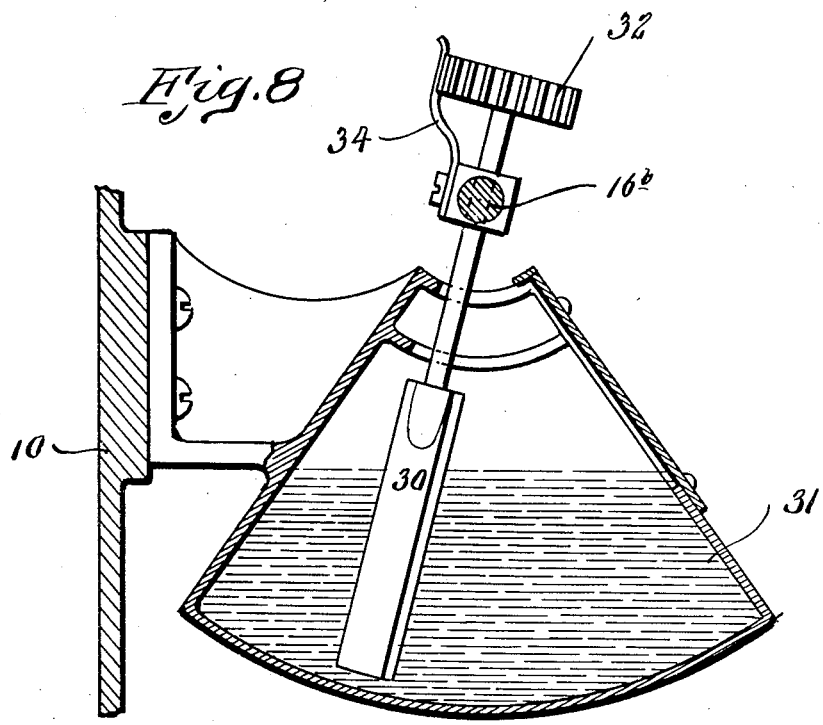
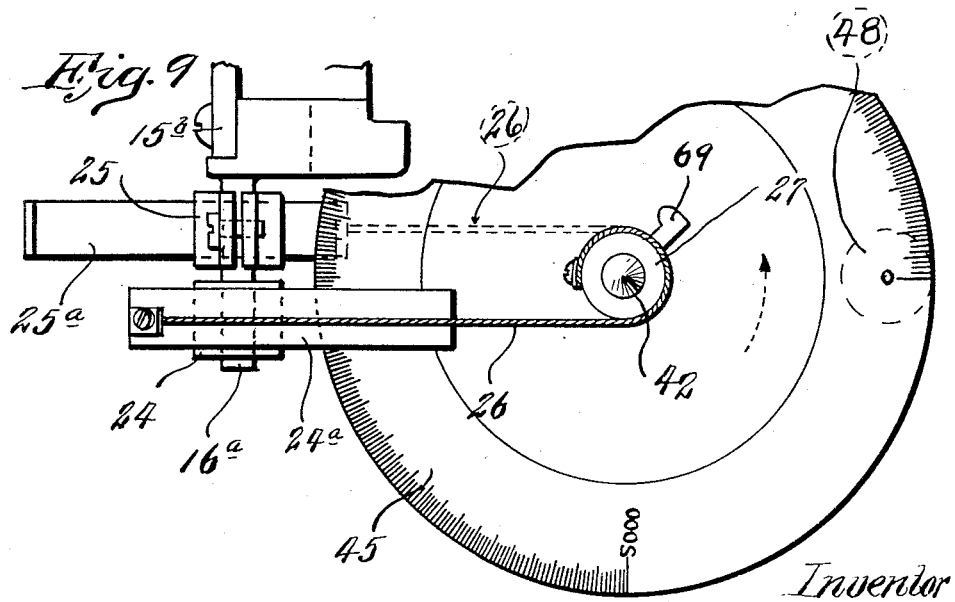

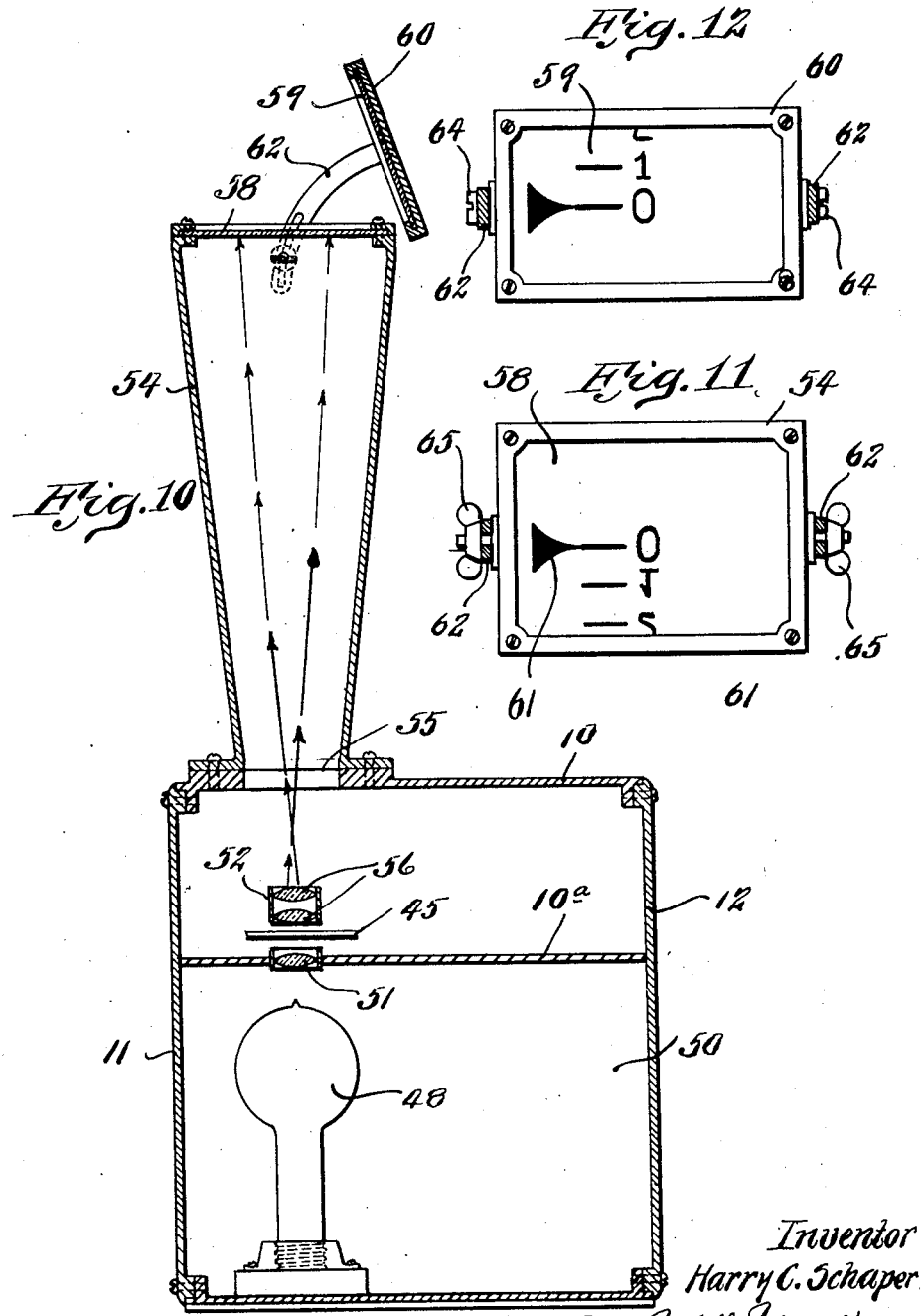

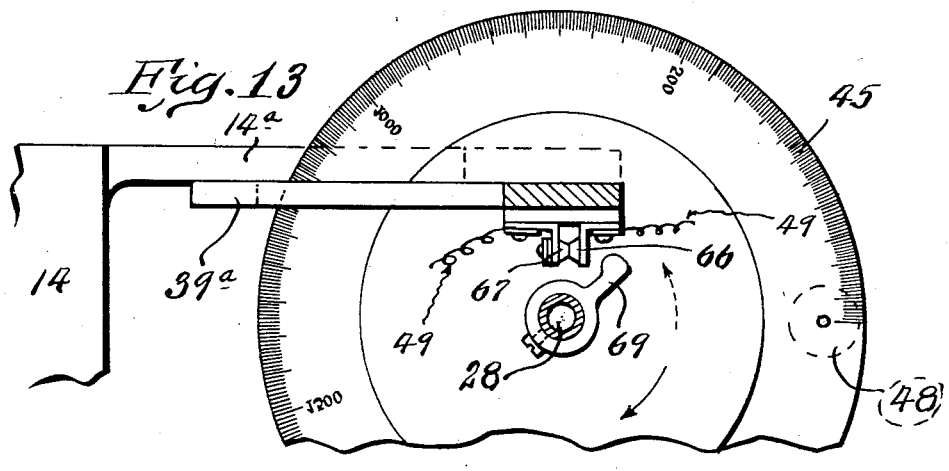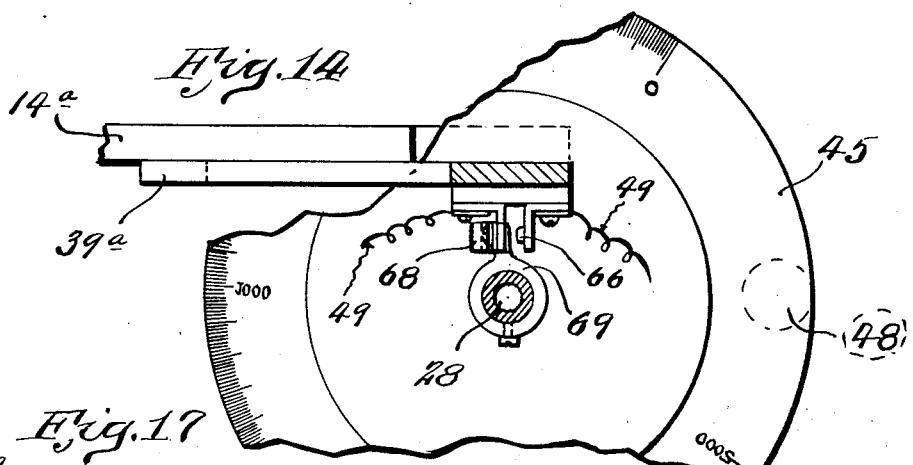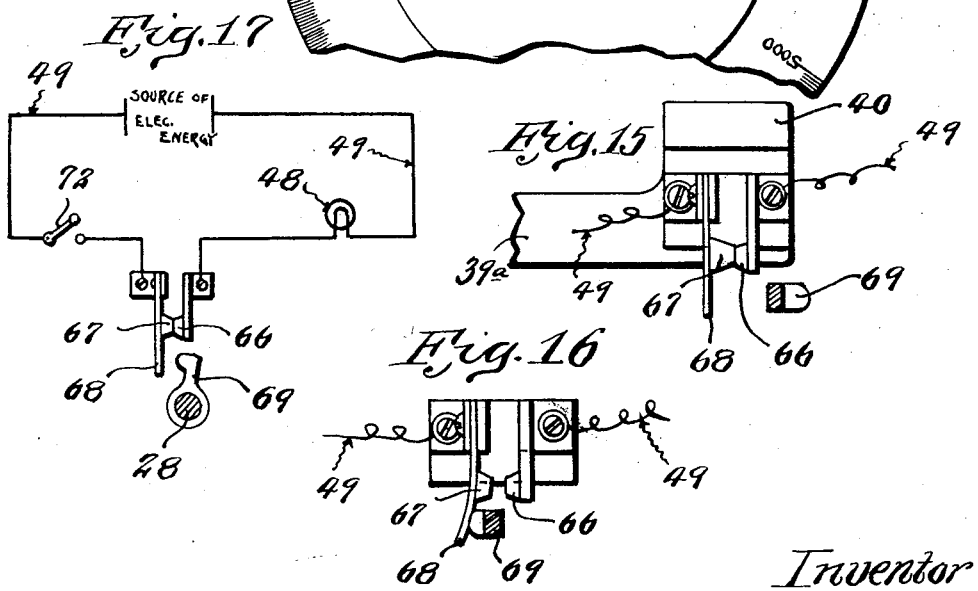

Patented Jan. 14, 1930

1,743,163

UNITED STATES PATENT OFFICE

HARRY C. SCHAPER, OF ST. LOUIS, MISSOURI, ASSIGNOR TO SCHAPER SCALE COMPANY, OF ST. LOUIS, MISSOURI, A CORPORATION OF MISSOURI.

WEIGHING SCALE

Application filed June 27, 1927. Serial No. 201,924.

This invention relates generally to weighing scales and more particularly to that type of scales in which the selected weight indicia is moved into a predetermined position in accordance with a load actuated scale beam and is rendered visible in an enlarged form.

In the previous forms of this type of scales such weight indicia is projected in an enlarged form upon the inner face of a translucent screen from which it is then read. This arrangement requires the screen to be maintained in a dark place or shaded against light rays and it is impossible to read such projected weight indicia when light is allowed to strike such screen. Furthermore, the weight indicia carrying member is journaled in horizontally disposed bearings usually ball bearings and consequently the accuracy of movement of the weight indicia carrying member is readily impaired by imperfections in bearings. Also the friction in such bearings and lost motion prohibit such mechanism to respond readily and accurately.

In such constructions the weight indicia member is weighted and consequently the extent of the indicating movement of such indicia member is limited on account of limited travel of the pendulum. This necessarily restricts the space available for the reception of weight indicia.

The objects of the present invention are to provide a weighing scale in which the magnified projected weight indicia can be easily read without the necessity of shading or otherwise protecting against light the member from which the projected weight indicia is read.

Other objects of the invention are to mount the weight indicia carrying member for movement in a horizontal plane about an axis disposed in a vertical plane, thereby eliminating horizontally disposed bearings for such weight indicia carrying member and enabling the vertical shaft of said carrying member to operate on pointed bearings. Thus a large amount of space is provided for use of weight indicia graduations as the movement of the horizontally disposed disk is not limited by the travel of pendulum.

Still other objects of the invention are to provide novel means for imparting to the weight indicia carrying member which is disposed in a horizontal plane the desired indicating movement from the part of a scale mechanism actuated in accordance with the load placed on said scale mechanism.

Further objects of the invention are to arrange the weight indicia annularly on a disk thereby increasing the capacity of said weight indicating mechanism and providing a more efficient arrangement of the weight indicia.

Still further objects of the invention are to provide novel means cooperating with the weight indicia projecting means for rendering the projected image of the weight indicia readily readable regardless of the light conditions.

Other objects of the invention are to so arrange the weight indicating mechanism as to permit actuation thereof in reverse direction beyond its balanced or zero position when locking the scale beam and to utilize this reverse movement for disengaging the electrical contacts of the electric current controlling the projecting means, whereby the latter is disabled when the indicating mechanism occupies inoperative position.

Still further objects of the invention are to provide an improved dampening means associated directly with the pendulum of the indicating mechanism, thereby providing greater displacement and eliminating friction and adhesive resistance encountered in the plunger type of dash pot.

Additional objects of the invention are to generally improve upon and simplify the construction of the weight indicating mechanism of the class described and to provide positive operating connection between the fulcrum member and the weight indicia member, whereby accurate positioning and reading of the projected weight indicia is assured at all times.

With these and other objects in view my invention consists of certain novel features and arrangements of parts hereinafter more fully described and claimed and illustrated in the accompanying drawings in which—

Figure 1 is a front elevation of my improved weighing scale showing the scale beam partly broken.

Figure 2 is an end elevation of same.

Figure 3 is a vertical cross section taken on line 3—3 of Figure 2.

Figure 4 is a vertical cross section taken on line 4—4 of Figure 1.

Figure 6 is a vertical cross section taken on line 6—6 of Figure 5.

Figure 7 is an enlarged vertical section taken through the vertical shaft of the weight indicia carrying member and the bearings therefor.

Figure 8 is a vertical cross section taken on line 8—8 of Figure 2.

Figure 9 is a horizontal cross section taken on line 9—9 of Figure 1.

Figure 10 is a vertical cross section taken on line 10—10 of Figure 1.

Figure 11 is a top plan view of the translucent screen, showing the weight indicia projected thereon and the pointer fixed on the face of said screen for indicating the proper indicia.

Figure 12 is a front elevational view of the reading mirror and showing the pointer and the weight indicia reflected thereon.

Figure 13 is a fragmental plan view of the weight indicia member and parts associated therewith and showing the electric contacts closed and the indicia member occupying zero or balanced position.

Figure 14 is a similar view but showing the weight indicia occupying displaced position when the scale beam is locked.

Figure 15 is a detail front elevational view of the contacts occupying closed positions as shown in Figure 13.

Figure 16 is a similar view with contacts disengaged as shown in Figure 16.

Figure 17 is a diagrammatic view of the electric circuit of source of light and showing the contacts closed and the manually operable switch opened.

Figure 5:
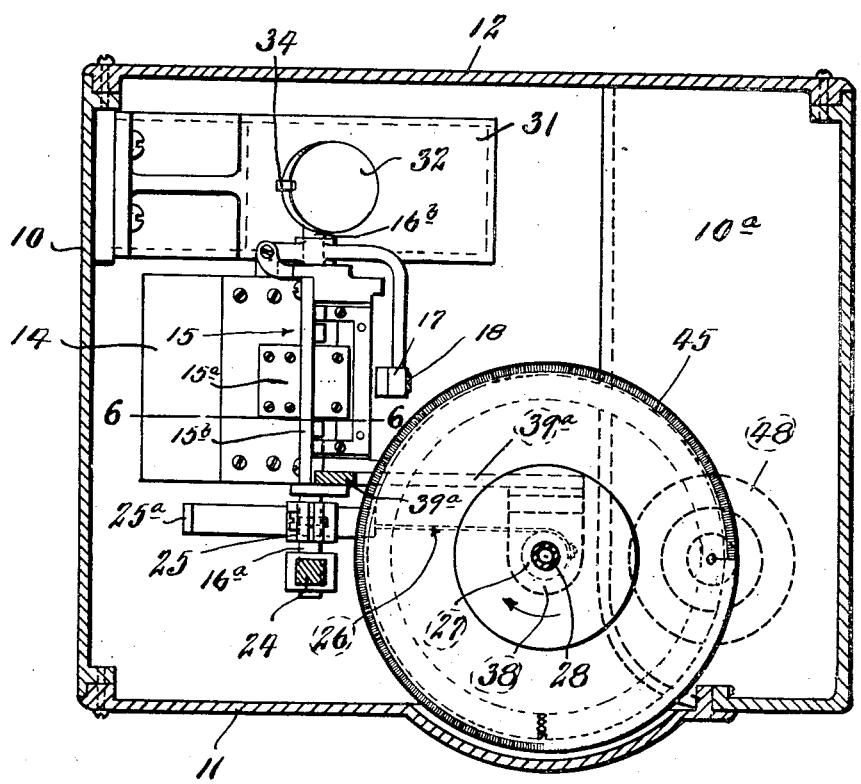
Figure 5 is a horizontal cross section taken on line 5—5 of Figure 1.

Referring by numerals to the accompanying drawings 10 indicates a box shaped housing having a removable front cover 11 and a removable rear cover 12. A casting support 14 is arranged in said housing being preferably attached to the bottom thereof. This support carries a bearing 15 comprising a stationary member 15$^a$ and the movable member 15$^b$ and is preferably of the improved construction disclosed in my copending application filed April 20, 1928, Serial No. 271,542. Fixed to the removable member 15$^b$ is a pair of trunnions 16$^a$ and 16$^b$ which are disposed horizontally and extend laterally from said movable member. A cam 17 is adjustably mounted on trunnion 16$^b$ and is provided with an arcuate face 17$^a$ to which is fixed the lower end of a tape or flexible connection 18 which extends upwardly from said cam and is secured at its upper end to the lower end of a vertically disposed rod 19.

This rod projects upwardly from housing 10 a suitable distance and terminates in a hook 20 which engages a loop 21 of a beam 22 of a suitable beam scale (not shown). This beam is actuated in accordance with the load placed on said beam scale and is moved upwardly by the load, thereby actuating through tape 18 and cam 17, trunnions 16$^a$ and 16$^b$ causing the latter to rock.

The forward trunnion 16$^a$ has mounted thereon a pair of radial arms 24 and 25 disposed in opposite directions namely upwardly and downwardly. Said arms terminate, respectively, in segmental portions 24$^a$ and 25$^a$ over which operate suitable cords or flexible connections 26. One end of each cord is secured to the respective segmental portions while the opposite end of each cord operates over and is secured to the periphery of one of a pair of pulleys 27.

These pulleys are fixed to a vertically disposed revoluble shaft 28 and are spaced thereon so as to bring each of them in a substantially horizontal plane with the respective segments 24$^a$ and 25$^a$ as shown in Figure 3. Thus as arms 24 and 25 are rocked by virtue of the operating connections thereof with beam 22, vertically disposed shaft 28 is actuated on its vertical axis in a definite ratio with the extent of movement of said scale beam. Arms 24 and 25 are moved in opposite directions thereby causing one or the other of said cords to exert a radial pull against the corresponding pulleys 27. These cords are connected to their respective pulleys on opposite sides relatively to each other so that as shaft 28 is actuated by the radial pull of one of said cords the other cord is wound on its respective pulley thereby causing positive actuation of said shaft in either direction.

A pendulum 29 is fixed to the movable member 15$^b$ and serves to counterbalance arms 24 and 25 and other parts associated with said movable member 15$^b$ and restores said parts to neutral position as soon as the upward pull through connection 18 is removed.

The rear trunnion 16$^a$ has fixed thereto a radially disposed paddle 30 which operates in a segmental pot 31. This pot is filled with a suitable fluid medium, such as oil or mercury, which, as the paddle 30 is moved therethrough, produces a dampening effect and eliminates undue play of the mechanism. This paddle 30 is adjustable angularly about its longitudinal axis, by means of a knurled hand wheel 32. By turning the paddle in proper directions the clearance between the sides of said pot and its edges can be increased or reduced, as desired, and the area through which the fluid medium flows from one side of the paddle to the other during the movement of the latter can thus be regulated. Thus resistance offered to the movement of said paddle can be controlled to provide the proper dampening effect. A spring 34 bears against wheel 32 and holds it in adjusted position.

Pulleys 27 are adjustably secured on shaft 28 by suitable fastenings 27ª. Shaft 28 is preferably formed tubular to reduce the weight thereof and secured in the lower end thereof is a member 35 provided with a downwardly opening conical seat 35ª in which is seated upwardly presented cone shaped end 36 of a member 37 which latter is adjustably seated, preferably being screw threaded, in a bearing 38 formed on and projecting laterally from the lower end of a bearing member 39. The upper end of said member is provided with a lateral projection 40 in which is adjustably disposed bearing 41 having a downwardly opening cone shaped seat 41ª in which has bearing the upwardly presented pointed end of a member 42 which latter is secured in the upper end of shaft 28. The particular arrangement of bearings for said shaft 28 reduces the friction to a minimum, dispenses with the use of ball bearings and provides for accurate and efficient operation of the shaft and parts associated therewith. Furthermore, both of the seats being presented downwardly they are protected against dust and moisture collecting therein and impairing the efficiency of the bearings. The tubular shaft 28 is preferably made of aluminum while the bearings are made of steel properly treated to insure long life of said bearings. This arrangement not only reduces the weight of the shaft assembly but also the cost of construction. Member 39 is held in position by an extension 14ª of support 14 and is secured thereto by suitable fastening devices 44.

A weight indicia carrying member 45 shown in the present construction in the form of a disk is secured to shaft 28 and is horizontally disposed at a suitable height in housing 10. Member 39 is provided with a U-shaped extension 39ª, as shown in Figures 1 and 3, so as to provide clearance for said disk 45. This disk is preferably formed of transparent material, such as glass, has arranged thereon a series of weight indicia 46 preferably opaque, and arranged concentrically with the axis of rotation of shaft 28 and spaced a suitable distance apart as shown in Figures 5, 13 and 14. Said disk 45 is mounted so as to intersect at a predetermined point the optical axis of a projecting means 47 as shown in Figure 3. This projecting means comprises a source of light 48 in the present instance in the form of an electric lamp supplied with electric current by means of a circuit 49. This lamp is enclosed in a chamber 50 formed in housing 10 by partition walls 10ª. A condensing lens 51 is arranged in one of the partition walls 10ª between said source of light 48 and disk 45 and has its axis intersecting the path of weight indicia 47 of said disk 45. Projecting lenses 52 are disposed on the opposite side of disk 45 coaxially with condensing lens 51 and serve to project, in an enlarged form, the weight indicia located in the optical axis upwardly into a tower 54 through an opening 55 formed in the upward wall of housing 10. Projecting lenses 52 are preferably arranged in a suitable tubular container 56 and the latter is adjustably arranged in a bracket 57 which latter is stationarily secured in the housing.

Tower 54 which is box shaped in cross section is detachably mounted on housing 10 and has its walls inclined from vertical so that the cross sectional area of the upper end of said tower is considerably larger than its lower end. This tower extends upwardly a suitable distance to provide for the proper magnification of the projected image of the weight indicia and its upper end is closed by a horizontally disposed translucent screen 58 unto which said weight indicia image is projected. This screen is substantially arranged in parallel with disk 45 and said image is projected directly onto said screen.

In order to enable the reading of the image projected onto said screen 58, a reflecting member 59 is mounted in a suitable frame 60 and is arranged rearwardly of said screen 58 as shown in Figures 1, 2 and 10. A suitable pointer 61 is etched or painted on the upper face of screen 58 and serves to point out or indicate the proper weight indicia. This pointer is preferably used, as it is customary, to project onto the screen 58 more than one weight indicia.

Frame 60 is preferably adjustable relative to screen 58 so as to bring the reflecting member 59 in the desired position with respect to said screen. This adjustment is accomplished by pivotally mounting the sides of said frame to the upper ends of a pair of arcuate arms 62 as indicated at 64. The lower ends of said arms are slotted and are adjustably secured to the side walls of tower 54 as indicated at 65. The weight indicia as arranged on disk 45 are projected onto screen 58 in reversed positions and appear on member 59 in their proper positions.

The arrangement of the reflecting member 59 in correlation with screen 58 causes the projected image to be reflected by said member 59 regardless of the light conditions. Thus, if the device is located in a well lighted room, the image projected onto screen 58 is hardly visible thereon, but can be read without any difficulty on the reflecting member 59. This is probably due to the fact that said reflecting member is arranged in close proximity to the screen 58 and truly reflects what appears on the screen, while the eye of the observer is affected by the stray light rays which interfere with the reading of the projected image as appearing on said screen.

Whether the above explanation is correct or not, it is an established fact that by the particular arrangement of my projecting means in correlation with the reflecting member, the weight indicia image, projected onto the translucent screen 58, is rendered plainly visible on the reflecting member 59 without the necessity of shading or otherwise protecting from the light either the translucent screen 58 or the reflecting member 59. This feature is a valuable asset in the use and operation of weighing scales of this particular type and greatly increases the usefulness and value thereof.

The circuit 49 of lamp 48 may be controlled either manually or automatically, or both. The automatic control comprises a pair of contacts 66 and 67, the former being stationary and the latter being movable, being carried by a resilient member 68 which normally tends to hold said movable contact 67 against stationary contact 66, thereby maintaining said circuit 49 closed and source of light 48 energized, as shown in Figure 15. A control arm 69 is fixed to and projects radially from shaft 28 and is adapted to engage resilient member 68 and to disengage contacts 66 and 67 and open electric circuit 49 when said shaft is moved to a predetermined inoperative position, as shown in Fig. 16.

This predetermined movement of shaft 28 to inoperative position is obtained when the scale beam 22 is manually locked against operation. This locking is accomplished by means of a trig member 70 which is mounted in a trig loop 71 and is adapted, when actuated, to bear against the top of the beam and cause it to move downwardly whereby the pendulum 29 is allowed to occupy position in a vertical plane. (See Figure 1.)

As will be noted, particularly in Figures 3 and 6, the mechanism is disposed so that when the parts associated with pivotal member 15ᵇ are in balance and the weight indicia member 45 is at zero position, pendulum 29 occupies position inclined from vertical, the angle of inclination of the pendulum axis being approximately five degrees (5°). When the scale beam 22 is moved downwardly by the trig member 70, this balanced relation is disturbed and consequently said pendulum is allowed to occupy vertical position.

Under balanced conditions with pendulum 29 occupying position out of vertical movable contact 67 of electric circuit 49 is in engagement with stationary contact 66 so that the source of light 48 is energized. This light will remain energized and the electric circuit 49 will remain closed as long as the mechanism is prevented from moving in a reversed direction beyond the zero or balanced position.

However, when the scale beam 22 is manually locked the indicating mechanism is moved reversely past its balanced position with pendulum 29 assuming substantially vertical position and the weight indicia member 45 moving past the zero position. This extra movement of disk 45 and shaft 28 causes control arm 69 to engage contact 67 and move it away from contact 66 thereby opening circuit 49 and disabling source of light 48.

Thus the circuit 49 is automatically opened by the locking of said scale beam and said indicating mechanism is rendered inoperative as long as said beam 22 is locked. Upon releasing said beam pivotal member 15ᵇ and parts associated therewith are freed and are allowed to move into balanced position under the influence of pendulum 29 with the weight indicia member 49 occupying zero position. This movement of the disk shaft 28 disengages control arm 69 from yielding contact 67 which resumes its position in engagement with stationary contact 66, whereby electric circuit 49 is closed and light 48 energized.

By means of this arrangement the electric contacts are not engaged and disengaged during each weighing operation but only when the scale is permanently locked, thereby eliminating excessive sparking and prolonging the life of said contacts and insuring positive disconnecting of the electrical circuit in correlation with the manual locking of the scale beam.

The weight indicia 45ᵃ arranged on member 45 are disposed so that the maximum weight indicia are spaced a suitable distance from the zero position of said weight indicating mechanism to provide ample clearance during the locking movement of the scale beam as indicated in Figure 5.

A poise 19ᵃ is disposed on rod 19 in the usual manner. A manually operable switch 72 may be interposed in circuit 49 for permitting the opening and closing of said circuit by the operator.

The particular operative connections between pivotal member 15ᵇ and shaft 28 of the weight indicia member 45 are positive and have no lost motion and are so arranged that said member 45 has a proportionately greater travel. This not only permits a large number of graduations to be used, increasing the capacity of the mechanism, but eliminates friction and renders the mechanism readily responsive.

The reflecting member or mirror 59 provides convenient means for reading the projected image of weight indicia and renders it visible irrespective of the light conditions.

The improved shaft assembly 28 provides simple and inexpensive construction and reduces friction to minimum.

Heretofore, the number of indicia used was limited, due to the fact that the travel of the weight indicia member was restricted to the number of degrees traversed by the pendulum and also due to the fact that it was commercially impractical to provide finer divisions of weight indicia. Where rack and pinion was used a certain amount of lost play was encountered and the friction was considerable, consequently the sensitiveness and accuracy was greatly impaired.

In my improved weight indicating mechanism the degree of travel of the weight indicia member is proportionately greater than the degree of movement of the pendulum, so that a larger amount of weight indicia may be placed on the disk, furthermore the diameter of the disk may be increased, if so desired.

While I have shown and described the preferred form of my invention, it is obvious that various changes in the construction and arrangement of parts of my weight indicating mechanism could be made and substituted for those herein shown and described without departing from the spirit of my invention.

I claim:

1. A weight indicating scale comprising in combination a housing having an opening in one wall, an open-ended tubular member secured to said wall in alignment with said opening and projecting therefrom, a weight indicia carrying member disposed in said housing and movable in accordance with a load actuated scale part, a translucent screen arranged in the outer end of said tubular member in spaced parallel relation with said carrying member, means cooperating with said carrying member for projecting the weight indicia thereof in an enlarged form onto said translucent screen, and a reflecting member arranged exteriorly of said tubular member in correlation with said translucent screen for reflecting the image of the weight indicia projected onto said screen.

2. A weight indicating scale comprising in combination a housing having an opening in one wall, an open-ended tubular member secured to said wall in alignment with said opening and projecting therefrom, a disk member mounted for revoluble movement in said housing and provided with series of weight indicia arranged concentrically therewith and adapted to be actuated in accordance with a load actuated scale part, a translucent screen arranged in the outer end of said tubular member parallel with said disk member and spaced a suitable distance therefrom, means including a source of light and projecting lenses for projecting said weight indicia in an enlarged form onto said screen, and a reflecting member arranged exteriorly of said tubular member and adjustable angularly relative to said translucent screen for reflecting the image of the weight indicia projected onto said screen.

3. A weight indicating scale comprising a horizontally disposed disk provided with weight indicia and mounted for movement about a vertical axis in correlation with a load actuated scale part, a translucent screen horizontally disposed above said disk in spaced relation therewith, means including a source of light for projecting in an enlarged form the weight indicia arranged on said disk onto said screen, and a reflecting member arranged adjustably adjacent to said translucent screen for reflecting the weight indicia projected thereon.

4. A weight indicating scale comprising a weight indicia disk member, a pair of oppositely disposed rock arms operatively connected to said disk member, a pendulum co-acting with said arms for maintaining said disk member in zero position, operative connections between said rock arms, and said disk, and a load actuated scale part for actuating said rock arms and said disk member in accordance with such load.

5. A weight indicating scale comprising a weight indicia carrying member, a pair of oppositely disposed rock arms operatively connected to said weight indicia member, a pendulum co-acting with said arms for yieldingly maintaining said carrying member in zero position, operative connections for said rock arms and adapted to be actuated by a load actuated scale part for positioning said weight indicia carrying member accordingly, a translucent screen spaced from and disposed parallel with said weight indicia carrying member, and means for projecting the weight indicia in an enlarged form onto said screen.

6. A weight indicating scale comprising a disk mounted for revoluble movement and provided with concentrically arranged series of weight indicia, a pair of oppositely disposed rock arms, a load actuated scale part, connections for operatively connecting said load actuated part with said rock arms, flexible connections connecting the said rock arms for actuating said disk member in accordance with said load actuated scale part, means coacting with said arms for normally maintaining said disk member in zero position, a translucent screen arranged in parallelism with said disk member, and projecting means including a source of light for projecting the weight indicia of said disk in an enlarged form onto said translucent screen.

7. A weight indicating scale comprising a disk mounted for revoluble movement and provided with concentrically arranged series of weight indicia, a pair of oppositely disposed rock arms, a load actuated scale part, connections for operatively connecting said load actuated part with said rock arms, flexible connections connected to said rock arms for actuating said disk member in accordance with said load actuated scale part, means coacting with said arms for normally maintaining said disk member in zero position, a translucent screen arranged in parallelism with said disk member, projecting means including a source of light for projecting the weight indicia of said disk in an enlarged form onto said translucent screen, and a reflecting member angularly disposed relative to said screen for reflecting the weight indicia image projected onto said screen.

8. A weight indicating scale comprising a disk mounted for revoluble movement and provided with concentrically arranged series of weight indicia, a pair of oppositely disposed rock arms, a load actuated scale part, connections for operatively connecting said load actuated part with said rock arms, flexible connections connected to said rock arms for actuating said disk member in accordance with said load actuated scale part, means coacting with said arms for normally maintaining said disk member in zero position, a translucent screen arranged in parallelism with said disk member, projecting means including a source of light for projecting the weight indicia of said disk in an enlarged form onto said translucent screen, a reflecting member angularly disposed relative to said screen for reflecting the weight indicia image projected onto said screen, and a fixed pointer cooperating with said reflecting member for selecting the weight indicia reflected thereon.

9. A weight indicating scale comprising a disk mounted for revoluble movement and provided with concentrically arranged series of weight indicia, a pair of oppositely disposed rock arms, a load actuated scale part, connections for operatively connecting said load actuated part with said rock arms, flexible connections connected to said rock arms for actuating said disk member in accordance with said load actuated scale part, means coacting with said arms for normally maintaining said disk member in zero position, a translucent screen arranged in parallelism with said disk member, projecting means including a source of light for projecting the weight indicia of said disk in an enlarged form onto said translucent screen, a reflecting member angularly disposed relative to said screen for reflecting the weight indicia image projected onto said screen, and means for adjustably supporting said reflecting member adjacent to said screen.

10. A weight indicating scale comprising a horizontally disposed weight indicia member mounted for revoluble movement, a horizontally disposed pivotal member, oppositely disposed rock arms carried by said pivotal member and operable to actuate said weight indicia member, a pendulum carried by said pivotal member for balancing said arms and said pivotal member and maintaining said weight indicia member in zero position, a scale part movable in accordance with the load placed on the scale, and operating connections between said scale part and said pivotal member, whereby said weight indicia member is actuated to move into weight indicating position in accordance with the load placed on the scale.

11. A weight indicating scale comprising a load actuated scale part, a horizontally disposed disk provided with weight indicia concentrically arranged thereon, means for revolubly mounting said disk, a horizontally disposed pivotal member, flexible connections between said pivotal member and said load actuated scale part, means actuated by said pivotal member for actuating said disk in accordance with the load placed on said scale part, means for yieldingly maintaining said pivotal member and said disk member in zero position, a translucent screen arranged parallel with said disk and spaced therefrom, and projecting means including a source of light for projecting the weight indicia in an enlarged form onto said screen.

12. A weight indicating scale comprising a load actuated scale part, a horizontally disposed disk provided with weight indicia concentrically arranged thereon, means for revolubly mounting said disk, a horizontally disposed pivotal member, flexible connections between said pivotal member and said load actuated scale part, means actuated by said pivotal member for actuating said disk in accordance with the load placed on said scale part, means for yieldingly maintaining said pivotal member and said disk member in zero position, a translucent screen arranged parallel with said disk and spaced therefrom, projecting means including a source of light for projecting the weight indicia in an enlarged form onto said screen, and a reflecting member angularly arranged adjacent to said screen and adjustable relatively thereto for reflecting the weight indicia image projected onto said screen.

13. A weight indicating scale comprising in combination with a load actuated scale part of a pivotally mounted weighted member, a flexible operating connection between said pivotal member and said actuated scale part, a rock arm fixed to said pivotal member, a revolubly mounted disk member provided with concentrically arranged weight indicia, a flexible connection between said arm and said disk member for actuating the latter in correlation with said load actuated scale part, a translucent screen arranged substantially parallel with said disk member and spaced therefrom, and a projecting means cooperating with said disk member for projecting said weight indicia in an enlarged form onto said screen.

14. A weight indicating scale comprising in combination with a load actuated scale part, of a pivotally mounted weighted member, a flexible operating connection between said pivotal member and said actuated scale part, a rock arm fixed to said pivotal member, a revolubly mounted disk member provided with concentrically arranged weight indicia, a flexible connection between said arm and said disk member for actuating the latter in correlation with said load actuated scale part, a translucent screen arranged substantially parallel with said disk member and spaced therefrom, a projecting means cooperating with said disk member for projecting said weight indicia in an enlarged form onto said screen, and a reflecting member arranged adjustably adjacent to said screen for reflecting the image of the weight indicia projected thereon.

15. A weight indicating scale comprising in combination with a load actuated scale part, of a pivotally mounted weighted member, a flexible operating connection between said pivotal member and said actuated scale part, a rock arm fixed to said pivotal member, a revolubly mounted disk member provided with concentrically arranged weight indicia, a flexible connection between said arm and said disk member for actuating the latter in correlation with said load actuated scale part, a translucent screen arranged substantially parallel with said disk member and spaced therefrom, a projecting means cooperating with said disk member for projecting said weight indicia in an enlarged form onto said screen, a reflecting member arranged adjustably adjacent to said screen for reflecting the image of the weight indicia projected thereon, and means fixedly arranged on the outer face of said screen and adapted to be reflected by said reflecting member for selectively pointing out the proper weight indicia.

16. A weight indicia scale comprising in combination with a load actuating scale part of a horizontally disposed pivotal member, a flexible operating connection between said load actuated scale part and said pivotal member, a rock arm fixed at one end to said member, a vertically disposed revoluble shaft, a horizontally disposed weight indicia carrying member fixed to said shaft and movable thereby in a horizontal plane, a flexible connection connected to the other end of said rock arm and to said shaft for imparting to the latter revoluble movement in accordance with the actuation of said load actuated scale part, means for normally maintaining said weight indicia carrying member in zero position, and projecting means cooperating with said weight indicia carrying member, said projecting means including a translucent screen for receiving the enlarged projected image of the weight indicia, and a reflecting member disposed angularly relative to said screen and adapted to reflect the weight indicia image projected onto said screen.

17. A weight indicating scale comprising in combination with a load actuated scale part, of a horizontally disposed pivotal member, a connection operatively connecting said pivotal member with said load actuated scale part, a dash pot mechanism operable by one end of said pivotal member, a pair of rock arms fixed to the other end of said pivotal member and extending radially therefrom in opposite directions, a vertically disposed revoluble shaft, a horizontally disposed disk fixed to said shaft and provided with concentrically arranged weight indicia, a pair of flexible connections connected at one of their ends to the respective arms and operatively engaging at their other ends the periphery of said shaft at points diametrically opposed relative to each other, means for yieldingly counterbalancing said pivotal member and parts associated therewith and maintaining said disk member in zero position, a translucent screen arranged in spaced parallel relation with said disk member, and means for projecting the weight indicia in an enlarged form onto said screen.

18. A weight indicating scale comprising in combination with a load actuated scale part, of a horizontally disposed pivotal member, a connection operatively connecting said pivotal member with said load actuated scale part, a dash pot mechanism operable by one end of said pivotal member, a pair of rock arms fixed to the other end of said pivotal member and extending radially therefrom in opposite directions, a vertically disposed revoluble shaft, a horizontally disposed disk fixed to said shaft and provided with concentrically arranged weight indicia, a pair of flexible connections connected at one of their ends to the respective arms and operatively engaging at their other ends the periphery of said shaft at points diametrically opposed relative to each other, means for yieldingly counterbalancing said pivotal member and parts associated therewith and maintaining said disk member in zero position, a translucent screen arranged in spaced parallel relation with said disk member, means for projecting the weight indicia in an enlarged form onto said screen, and a reflecting member arranged adjacent to said screen and adjustable relatively thereto for reflecting the weight indicia projected thereon.

19. In a weighing scale, the combination with a scale beam and a trig for manually locking the same, of a weight indicating mechanism operable by said scale beam, said mechanism including a weight indicia member movable in correlation with said scale beam, a translucent screen arranged in parallelism with said weight indicia member, projecting means including a source of light for projecting said weight indicia in an enlarged form onto said screen, electric contacts for controlling said source of light and a control arm movable in correlation with said weight indicia member in one direction and adapted to be moved in opposite direction when said scale beam is locked by said trig member, thereby disengaging said electric contacts and disabling said projecting means.

20. In a weighing scale, the combination with a scale beam and a trig for manually locking the same, of a weight indicating mechanism operable by said scale beam, said mechanism including a weight indicia member movable in correlation with said scale beam, a translucent screen arranged in parallelism with said weight indicia member, projecting means including a source of light for projecting said weight indicia in an enlarged form onto said screen, electric contacts for controlling said source of light, a control arm movable in correlation with said weight indicia member in one direction and adapted to be moved in opposite direction when said scale beam is locked by said trig member, thereby disengaging said electric contacts and disabling said projecting means, and a reflecting member arranged angularly relative to said screen for reflecting the weight indicia projected thereon.

21. In a weight indicating scale the combination with a scale part movable in accordance with a load placed on said scale, of a weight indicia member operable in correlation with said scale part, a translucent screen arranged in spaced relation with said weight indicia member, projecting means for projecting the weight indicia in an enlarged form onto said screen, an electric circuit for controlling said projecting means, contact elements arranged in said circuit, said contact elements being normally interengaged, and a control arm adapted to disengage said contact elements when said weight indicia member is actuated in opposed direction past its zero point.

22. In a weight indicating scale the combination with a scale part movable in accordance with a load placed on said scale, of a balanced weight indicia member movable in an indicating direction by said scale part and movable in reverse direction to zero position upon the restoration of balance, a translucent screen arranged in spaced relation with said weight indicia member, projecting means for projecting said weight indicia member in an enlarged form onto said screen, an electric circuit for rendering said projecting means active, normally closed contacts arranged in said circuit, and a control arm coacting with said weight indicia member and adapted when said indicia member is moved in reverse direction beyond its zero position to disengage said contacts and open said circuit and thereby render said projecting means inactive.

23. In a weight indicating scale the combination with a scale part movable in accordance with the load placed on said scale, of a balanced weight indicia member movable in indicating direction by said scale part and movable in reverse direction beyond its zero position when said scale part is rendered inactive, a translucent screen arranged in spaced relation with said weight indicia member, projecting means, including a source of light, for projecting said weight indicia member in an enlarged form onto said screen, an electric circuit for energizing said source of light, contacts arranged in said circuit, said contacts being interengaged to close said circuit during the normal operating movements of said weight indicia member, and a control arm coacting with said weight indicia member and adapted, when said weight indicia member is moved in reverse direction beyond its zero position when said scale part is rendered inactive, to disengage said contacts and cause the de-energization of said source of light by opening said contact circuit.

24. In a weight indicating mechanism for scales the combination with a weight indicia member revolubly mounted and movable in a reverse direction past the zero point, of projecting means cooperating with said weight indicia member for projecting the indicia thereof, an electric circuit normally closed for rendering said projecting means operative, and means for opening said circuit and rendering said projecting means inoperative when said weight indicia member is moved in reverse direction past its zero point.

25. In a weight indicating mechanism for scales the combination with a revoluble weight indicia member, of a pendulum operatively associated with said weight indicia member for maintaining the latter in balanced zero position, said indicia member being adapted to be actuated in one direction in accordance with the load placed on the scale, a translucent screen arranged in spaced relation with said weight indicia member, projecting means including a source of electric light for projecting the weight indicia in an enlarged form onto said screen, electric circuit for energizing said source of light, contacts interposed in said circuit for normally maintaining said circuit closed, and means cooperating with said weight indicia member and adapted to disengage said contacts and de-energize said source of light when the balanced zero position of said weight indicia member is disturbed and said member is caused to move past its zero point in a reverse direction to its indicating movement.

26. In a weight indicating mechanism for scales the combination with a load actuated scale part adapted to be locked in inoperative position, of a weight indicia member operable in correlation with said scale part and adapted to be actuated reversely past its zero position when said scale part is locked, a translucent screen arranged in spaced relation with said weight indicia member, projecting means for projecting the weight indicia onto said screen, a normally closed circuit for rendering said projecting means operative, and means for opening said circuit and rendering said projecting means inoperative when said weight indicia member is actuated in reverse direction past its zero point in correlation with the locking of said scale part.

27. In a weight indicating mechanism for scales the combination with a load actuated scale part adapted to be actuated by the load in one direction and to be manually operated in opposite direction, of a weight indicia member operable in indicating direction by said scale part, a pendulum associated with said weight indicia member and said load actuated scale part for maintaining said weight indicia member in zero position and adapted to move said weight indicia member in a reverse direction past its zero point when said scale part is manually operated in appropriate direction, a translucent screen arranged in spaced relation with said weight indicia member, projecting means including a source of light for projecting the weight indicia onto said screen, an electric circuit for energizing said source of light, contacts for normally maintaining said circuit closed, and means cooperating with said weight indicia member for disengaging said contacts and opening said circuit when said scale part is manually actuated in the appropriate direction and said weight indicia member is actuated in reverse direction by said pendulum.

28. In a weight indicating mechanism for scales the combination with a load actuated scale part adapted to be locked in inoperative position, of a horizontally disposed pivotal member, a flexible connection between said pivotal member and said scale part, a weight indicia member mounted for revoluble movement about the vertical axis, a screen arranged in spaced relation with said weight indicia member, projecting means including a source of light for projecting the weight indicia onto said screen, a pendulum carried by said pivotal member and adapted to balance the parts associated with said pivotal member and maintain said weight indicia member in zero position, said pendulum when in balance occupying a position out of vertical plane, and being movable by said scale part when the latter is locked into a substantially vertical unbalanced position, an electric circuit for said source of light, and means cooperating with said weight indicia member for opening said circuit and rendering said projecting means inoperative when said scale part is moved into a locked position.

29. In a weight indicating mechanism for scales, a vertically disposed revoluble shaft, a horizontally disposed weight indicia member fixed on said shaft, a translucent screen arranged in spaced relation with said member, projecting means for projecting weight indicia onto said screen, an electric circuit for controlling said projecting means, a pair of contacts for closing said circuit, one of said contacts being fixed and the other yieldable, and an arm fixed on said shaft in spaced relation with said yieldable contact and adapted to engage the same and disengage it from said stationary contact when said weight indicia member is actuated to a predetermined inoperative position.

30. In a weight indicating mechanism for scales the combination with a load actuated scale part, of a vertically disposed revoluble shaft, a disk of transparent material coaxially fixed to said shaft and provided with weight indicia concentrically disposed thereon, a translucent screen arranged in spaced relation with indicia member, projecting means including a source of light for projecting weight indicia onto said screen, an energizing electric circuit for said source of light, normally closed contacts interposed in said circuit, means operatively associated with said scale part and said shaft for balancing said indicia member in zero position and adapted, when said balance is disturbed by the disassociation of said scale part, to move said disk in a reverse direction past its zero position, and means on said shaft normally disengaged from said contacts and adapted to engage said contacts and open said circuit when said disk is displaced past the zero point.

31. In a weight indicating scale the combination with a housing and a load actuated scale part disposed exteriorly of said housing, of a horizontally disposed fulcrum member supported in said housing, a flexible connection operatively connecting said scale part with said fulcrum member, a horizontally disposed transparent disk provided with concentrically arranged weight indicia and revoluble about a vertical axis, means operatively connecting said disk with said fulcrum member for actuating said disk in accordance with the actuation of said scale part, a source of light in said housing, projecting means arranged in correlation with said source of light and said disk for projecting the weight indicia of the latter outwardly from said housing through an opening formed in one of the walls thereof, an extension on said housing arranged in correlation with the optical axis of said projecting means, and a horizontally disposed translucent screen arranged in said extension in spaced relation with said disk for receiving the enlarged projected image of the weight indicia, and a reflecting member arranged angularly relative to said screen for enabling the reading of the weight indicia image projected onto said screen.

32. In a weight indicating scale the combination with a housing and a load actuated scale part disposed exteriorly of said housing, of a horizontally disposed fulcrum member supported in said housing, a flexible connection operatively connecting said scale part with said member, a horizontally disposed transparent disk provided with concentrically arranged weight indicia and revoluble about a vertical axis, means operatively connecting said disk with said fulcrum member for actuating said disk in accordance with the actuation of said scale part, a source of light in said housing, projecting means arranged in correlation with said source of light and said disk for projecting the weight indicia of the latter outwardly from said housing through an opening formed in one of the walls thereof, an extension on said housing arranged in correlation with the optical axis of said projecting means, a horizontally disposed translucent screen arranged in said extension in spaced relation with said disk for receiving the enlarged projected image of the weight indicia, an indicating mark fixed on said screen in correlation with the weight indicia projected thereonto, and a reflecting member arranged angularly relative to said screen for enabling the reading of said indicating mark and the weight indicia projected onto said screen.

33. In a weight indicating scale the combination with a housing and a load actuated scale part disposed exteriorly of said housing, of a horizontally disposed fulcrum member supported in said housing, a flexible connection operatively connecting said scale part with said fulcrum member, a horizontally disposed transparent disk provided with concentrically arranged weight indicia and revoluble about a vertical axis, means operatively connecting said disk with said fulcrum member for actuating said disk in accordance with the actuation of said scale part, a source of light in said housing, projecting means arranged in correlation with said source of light and said disk for projecting the weight indicia of the latter outwardly from said housing through an opening formed in one of the walls thereof, an extension on said housing arranged in correlation with the optical axis of said projecting means and a horizontally disposed translucent screen arranged in said extension in spaced relation with said disk for receiving the enlarged projected image of the weight indicia, a reflecting member arranged angularly relative to said screen for enabling the reading of the weight indicia image projected onto said screen, and means for adjustably supporting said reflecting member.

34. In a weight indicating scale the combination of a housing having an opening in one of its walls, actuating mechanism in said housing and adapted to be operated by a load actuated scale part, a weight indicia member revolubly mounted in said housing and actuated by said mechanism in accordance with said scale part, a source of light in said housing, projecting means arranged in correlation with said source of light and said weight indicia member whereby said indicia member intersects the optical axis of said projecting means, an open ended tubular member secured at one end to said apertured wall of said housing and extending therefrom, a translucent screen closing the opposite end of said tubular member and adapted to receive the enlarged image of the weight indicia, and a reflecting member arranged exteriorly of said tubular member and in correlation with said screen for reflecting said screen and the weight indicia appearing thereon.

35. In a weight indicating scale the combination of a housing having an opening in one of its walls, actuating mechanism in said housing and adapted to be operated by a load actuated scale part, a weight indicia member revolubly mounted in said housing and actuated by said mechanism in accordance with said scale part, a source of light in said housing, projecting means arranged in correlation with said source of light and said weight indicia member, whereby said indicia member intersects the optical axis of said projecting means, an open ended tubular member secured at one end to said apertured wall of said housing and extending therefrom, a translucent screen closing the opposite end of said tubular member and adapted to receive the enlarged image of the weight indicia, an indicating mark arranged on the outer face of said screen, and a reflecting member arranged exteriorly of said tubular member in correlation with said screen for reflecting said indicating mark and the weight indicia projected onto said screen.

36. In a weight indicating scale the combination of a housing having an opening in one of its walls, actuating mechanism in said housing and adapted to be operated by a load actuated scale part, a weight indicia member revolubly mounted in said housing and actuated by said mechanism in accordance with said scale part, a source of light in said housing, projecting means arranged in correlation with said source of light and said weight indicia member, whereby said indicia member intersects the optical axis of said projecting means, an open ended tubular member secured at one end to said apertured wall of said housing and extending therefrom, a translucent screen closing the opposite end of said tubular member and adapted to receive the enlarged image of the weight indicia, a reflecting member arranged exteriorly of said tubular member and in correlation with said screen for enabling the reading of the weight indicia projected onto said screen and said indicating mark, and means for supporting said reflecting member, said means being adjustable to adjust the position of said member with respect to said screen.

37. In a weight indicating scale the combination of a housing having an opening in one of its walls and a chamber partitioned off from the interior of said housing, a source of light in said chamber, projecting means for projecting the light from said chamber, said projecting means including a condensing lens arranged in an opening formed in the wall of said chamber, a weight indicia member revolubly mounted in said housing and operating across the optical axis of said projecting means, whereby the weight indicia of said member are projected outwardly from said housing through the opening formed in one of the walls thereof, a translucent screen arranged in spaced relation with said weight indicia member and adapted to receive in an enlarged form the image of the projected weight indicia, and a mirror disposed angularly relative to said screen for enabling the reading of characters appearing thereon.

38. In a weight indicating scale the combination of a housing, a weight indicia member operatively disposed therein, an open ended tubular member secured exteriorly to said housing and opening thereinto, a translucent screen arranged in the outer end of said tubular member, a source of light, a projecting means cooperating with said source of light and said weight indicia member and having its optical axis projecting into said tubular member for projecting the weight indicia in an enlarged form onto said screen, and a reflecting member arranged in spaced relation with said screen for reflecting the weight indicia projected onto said screen.

39. In a weight indicating scale the combination of a housing, a weight indicia member operatively disposed therein, an open ended tubular member secured exteriorly to said housing and opening thereinto, a translucent screen arranged in the outer end of said tubular member, a source of light, a projecting means cooperating with said source of light and said weight indicia member and having its optical axis projecting into said tubular member for projecting the weight indicia in an enlarged form onto said screen, a reflecting member arranged in spaced relation with said screen for reflecting the weight indicia projected onto said screen, and means for adjustably supporting said reflecting member whereby the latter may be adjusted angularly relative to said screen.

40. In a weight indicating scale the combination with a housing, a weight indicia member operatively disposed therein, and projecting means including a source of light arranged in said housing, of a tubular member secured to and opening into said housing, a translucent screen arranged in the outer end of said tubular member substantially in parallel with said weight indicia member and adapted to receive the projected image of the weight indicia of said indicia member, a reflecting member disposed exteriorly of said tubular member in spaced relation with said screen for reflecting the weight indicia appearing thereon, and arms adjustably supported on said tubular member and carrying said reflecting member for enabling the adjustment of the latter relative to said screen.

In testimony whereof I hereunto affix my signature this 11th day of June, 1927.

HARRY C. SCHAPER.